July 5, 1932.  G. F. WIKLE  1,865,601
BEAD SETTING RING
Filed Oct. 26, 1929
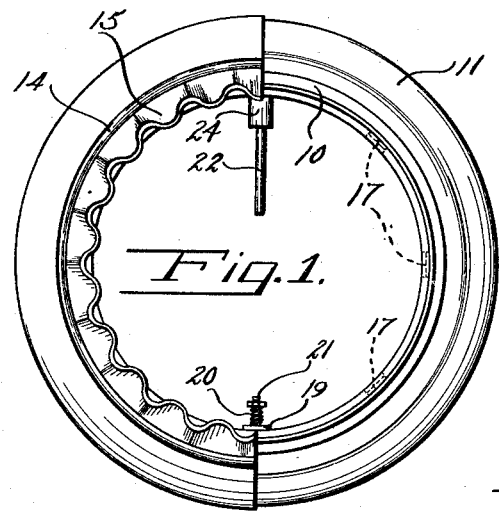
Fig. 1.
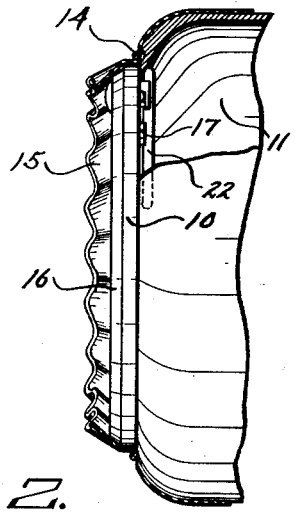
Fig. 2.
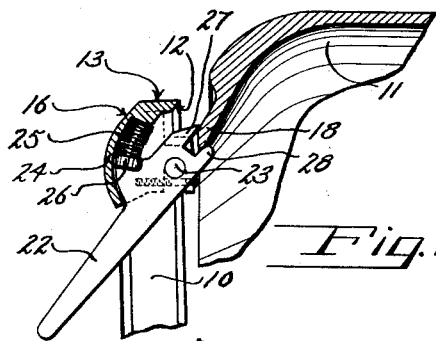
Fig. 3.
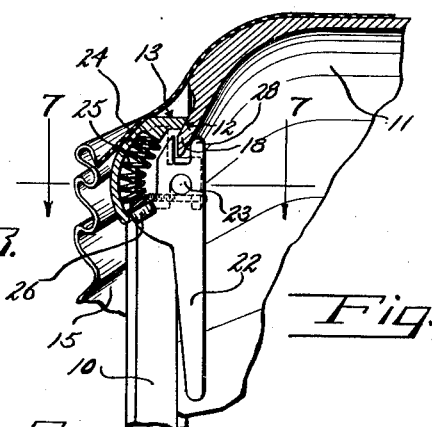
Fig. 4.
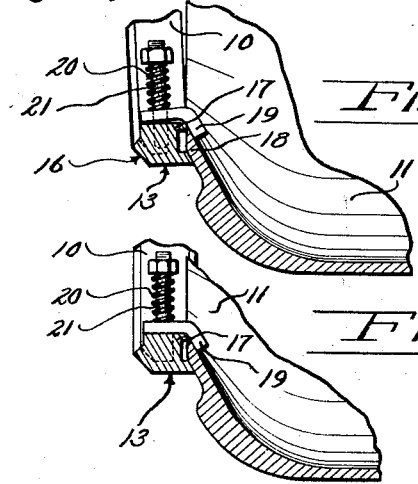
Fig. 5.
Fig. 6.
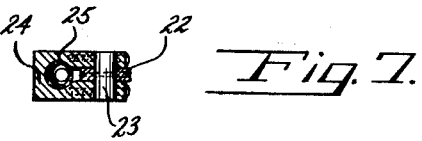
Fig. 7.
INVENTOR.
George F. Wikle.
BY
ATTORNEY.

Patented July 5, 1932

1,865,601

UNITED STATES PATENT OFFICE

GEORGE F. WINKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

BEAD SETTING RING

Application filed October 26, 1929. Serial No. 402,687.

My invention pertains to tire building machines and more especially to that portion of the machine dealing with the location of the beads of pneumatic tire carcasses.

The purpose of my invention is to provide an improved bead setting device for use with drum types of building machines. Other and more particular objects will be apparent from the following specification and claims.

In the drawing which illustrates one embodiment of my invention,

Fig. 1 is a side view of a tire building drum showing my improved bead setting ring, the carcass material and bead being cut away from the right-hand half to better show the position of the ring;

Fig. 2 is a front view, partially broken away, of Fig. 1;

Fig. 3 is a detail view of the ring being drawn in place to the drum;

Fig. 4 is a similar view with the ring in place on the drum;

Fig. 5 is a view of the drum and ring at a point opposite that shown in Fig. 3, the ring being partly in place;

Fig. 6 is a similar view with the ring fully in place on the drum; and

Fig. 7 is a view taken substantially on line 7—7 of Fig. 4.

In the drawing a bead setting ring 10 is located adjacent a bead building drum 11. The ring is formed at its drum engaging surface 12 to correspond to that portion of the drum, and the diameter of the outer surface 13 of the ring is such as to snugly engage a bead 14. Tire building material 15 is applied to the drum 11, with the edges overlying the ring 10 as shown in Fig. 2. The ring is tapered at 16 so as to allow the material 15 to converge toward the axis of the drum. The bead 14 is pressed onto the ring over the material and then stitched firmly into the corner formed by the ring and the drum, the ring positively defining the location of the bead.

In order that the ring 10 may be quickly and easily located on the drum 11 I have provided the ring with a series of lugs 17 adapted to engage a flange 18 of the drum and thus centralize the ring with respect to the drum. At one point on the ring 10 I have located a hook 19 yieldably held against one of the lugs 17 on the inner surface of the ring by a spring 20 carried by a bolt 21. At a point on the ring 10 substantially opposite the hook 19 is a handle 22 pivoted at 23 to a boss 24 made integral with the ring 10. A spring 25 in the boss 24 and abutting a spring seat 26 on the handle 22 tends to hold the handle in the position shown in Fig. 4. When in this position a pair of fingers 27 and 28 fit on either side of the flange 18 thus holding the ring 10 against the drum.

To bring the ring to this position the hook 19 is brought over the edge of the flange 18 (see Fig. 5) and the handle 22 canted back against the action of spring 25 (see Fig. 3) so that the fingers 27 and 28 can be brought to fit over the edge of the flange 18. Then, upon the release of handle 22 and through the action of spring 25, the handle will pivot about 23 causing the finger 28 to act as a cam against the inner surface of the flange 18 and thus draw the ring 10 to the drum.

The surface 13 of ring 10 may be made wide enough so that it will accommodate two or more beads if desired.

After the tire material has been stitched about the beads the ring may be quickly and easily removed by drawing outward on the handle 22. The finger 27 will now act as a cam against the outer surface of the flange 18 to release the ring.

Having thus described my invention, I claim:

1. In a device of the character described a bead setting ring adapted to be removably locked to a tire former comprising an annular surface substantially equal to the inner diameter of a tire bead, a series of lugs on the ring adapted to engage with a flange on the tire former, a hook at one portion of the ring adapted to fit over the flange on the tire former, and means opposite the said hook for holding the ring to the tire former.

2. In a device of the character described a bead setting ring adapted to form a bead receiving recess when in engagement with a tire former, means for centralizing the ring at the bead portion of the tire former and a lever pivoted to the ring and provided with a fork adapted to engage the edge of the tire former and move the ring to and from operative position.

GEORGE F. WIKLE.